United States Patent [19]

Maeda et al.

[11] Patent Number: 5,139,122
[45] Date of Patent: Aug. 18, 1992

[54] TORQUE CONVERTER INCLUDING A LOCK-UP CLUTCH

[75] Inventors: Hiroaki Maeda, Toyota; Takahiro Misu, Tenpaku; Masahiro Omura, Inazawa; Yuzo Masuda, Kariya; Toshihiro Kobayashi, Toyota, all of Japan

[73] Assignee: Aisin Seiki Kabushiki Kaisha, Kariya, Japan

[21] Appl. No.: 676,313

[22] Filed: Mar. 28, 1991

[30] Foreign Application Priority Data

Mar. 28, 1990 [JP] Japan .................. 2-77065

[51] Int. Cl.$^5$ .................. F16H 45/02; F16D 3/66
[52] U.S. Cl. .................. 192/3.29; 192/106.2; 464/68
[58] Field of Search .......... 192/3.28, 3.29, 3.3, 192/30 V, 106.1, 106.2; 464/66, 68

[56] References Cited

U.S. PATENT DOCUMENTS

| | | | |
|---|---|---|---|
| 2,284,278 | 5/1942 | Goodwin | 192/106.2 |
| 4,347,717 | 9/1982 | Lamarche | 192/106.2 X |
| 4,441,594 | 4/1984 | Kubo et al. | 192/3.28 |
| 4,559,024 | 12/1985 | Tamura et al. | 192/106.2 X |
| 4,580,672 | 4/1986 | Caray | 192/106.2 |
| 4,668,207 | 5/1987 | Koshimo | 192/106.2 X |
| 4,693,348 | 9/1987 | Tsukamoto et al. | 192/3.29 |
| 4,716,998 | 1/1988 | Tsukamoto et al. | 192/3.3 |
| 4,768,633 | 9/1988 | Kubo et al. | 192/3.3 |

FOREIGN PATENT DOCUMENTS

| | | | |
|---|---|---|---|
| 58-131431 | 8/1983 | Japan | 192/106.2 |
| 60-175865 | 9/1985 | Japan | 192/106.2 |
| 61-252963 | 11/1986 | Japan | 192/3.3 |
| 61-252964 | 11/1986 | Japan | 192/3.3 |
| 62-56623 | 3/1987 | Japan | 192/106.2 |
| 62-194069 | 8/1987 | Japan | 192/3.3 |

*Primary Examiner*—Richard Lorence
*Attorney, Agent, or Firm*—Burns, Doane, Swecker & Mathis

[57] ABSTRACT

A lock-up clutch in a torque converter includes a front cover connected to an input shaft, a piston disposed between the front cover and a torque converter mechanism that can be axially moved on an input shaft and can be engaged or disengaged with the front cover. A first member is disposed between the piston and the torque converter mechanism, a second member is provided at both sides of the first member and the second member is rotatable with respect to the first member for a first predetermined rotational angle. A first elastic member is disposed between the first member and the second member for elastically connecting the first member and the second member with each other and a second elastic member is provided inwardly of the first elastic member for elastically connecting the first member at a second predetermined rotational angle which is less than the first predetermined rotational angle. A stopper member is provided at the outer periphery of the second member for slowing the rotational speed of the first member with respect to the second member by stopping the projection in the rotational direction at a third predetermined rotational angle which is less than the first predetermined rotational angle and more than the second predetermined rotational angle.

1 Claim, 3 Drawing Sheets

Fig. 3
Fig. 4
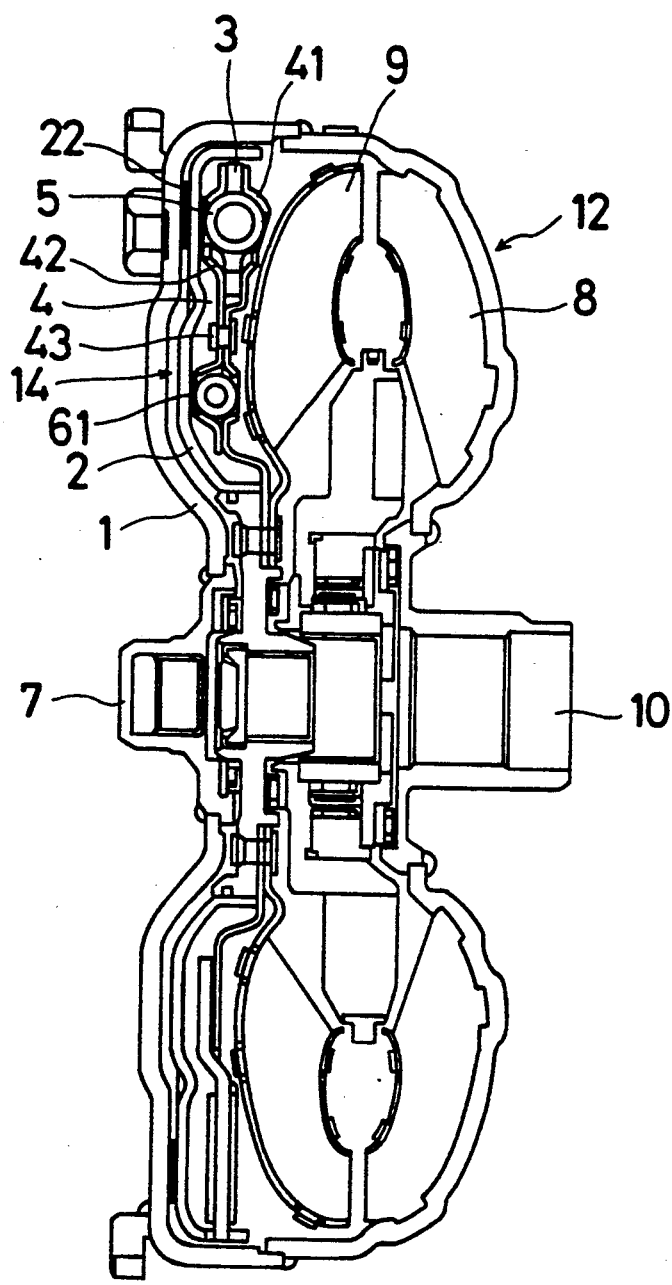
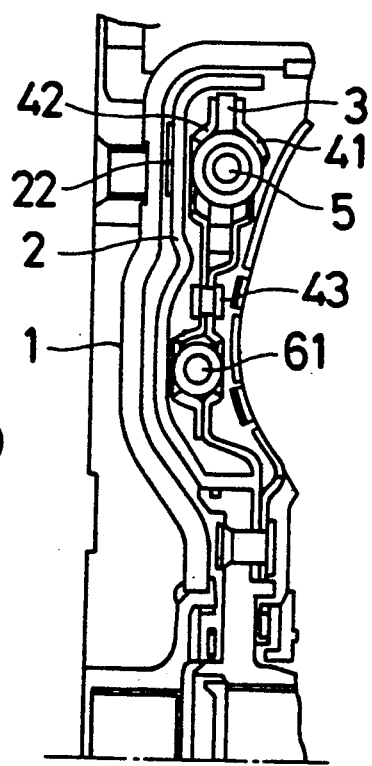

TORQUE CONVERTER INCLUDING A LOCK-UP CLUTCH

BACKGROUND OF THE INVENTION

1. Field of Invention

This invention relates to improvements in a lock-up clutch provided in a torque converter used in an automobile and, more particularly, relates to a damper mechanism in a clutch mechanism.

2. Description of the Related Art

A torque converter of the type having a lock-up clutch is provided between an engine and an automatic transmission in order to improve fuel efficiency of the vehicle in which it is utilized.

The conventional lock-up clutch type torque converter is hereinafter described according to FIG. 3 which is an axially cross-sectional view of the lock-up clutch type torque converter.

Referring to FIG. 3, a lock-up clutch type torque converter comprises a torque converter mechanism 12, including a pump 8 which is connected for rotation with an input shaft 7 for transmitting rotational torque to a turbine 9 which is connected for rotation with an output shaft 10. A clutch mechanism is indicated at 14. The clutch mechanism 14 includes a front cover 1 which is connected to the input shaft 7 at an inner periphery thereof, a lock-up piston 2 which is disposed between the front cover 1 and the torque converter mechanism 12. The piston 2 is mounted on the input shaft 7 so as to be axially movable and engage or disengage with the front cover 1 via a frictional member 22. Movement of the piston is controlled by oil pressure supplied into a space defined by the front cover 1 and the lock-up piston 2. An annular disk 3 is arranged between the lock-up piston 2 and the torque converter mechanism 12 and has a plurality of concave portions 31 (FIG. 5) formed on the outer periphery at equally spaced intervals which are engaged with an axially extending projection 21 at the outer periphery of the lock-up piston 2. A plate member 4 is provided at both sides of the annular disk 3 and is elastically connected to the annular disk 3 by a plurality of elastic members 5, 61, 62. The plate member 4 is defined by a main plate 41 and a sub plate 42 connected with each other by a pin 43.

FIG. 4 illustrates a partial enlarged view of the clutch mechanism 14 of FIG. 3. FIG. 5 illustrates a plane view of damper of the clutch mechanism 14 of FIG. 4. Referring to FIG. 4 and FIG. 5, the annular disk 3 is rotatable with respect to the main plate 41 and the sub plate 42 and is elastically connected thereto by the coil spring 5. The coil spring 5 is compressed by the annular disk 3, the main plate 41 and the sub plate 42 in a first compression stage at the time rotational torque is input from the engine (not shown).

The coil springs 61 and 62 are disposed radially inwardly of the coil spring 5. A predetermined rotational angle "α" is provided between the coil spring 61 or 62 and the annular disk 3. The coil springs 61 and 62 are compressed by rotation of the annular disk 3 through an angle greater than the predetermined rotational angle "α".

In the second stage of compression, the annular disk 3 has a flange 32 which extends radially inwardly. The flange 32 presses against the coil spring 61 only after movement through a predetermined rotational angle "β". The flange 32 contacts to an open end 4b of an opening 4a in a space 4d which receives the coil spring 61. In a third compression stage, the annular disk 3 rotates through an angle greater than the rotational angle "α+β," and the annular disk 3 rotates together with the plate member 4 by the flange 32 and the open end 4b of the opening 4a.

Another conventional lock-up clutch torque converter is illustrated in FIG. 6. A stopper portion of the damper structure of the clutch mechanism has a cut-away portion 33 which is formed in the annular disk 3. A stopper pin 44 connects the main plate 4 and the sub plate 42 with each other. The annular disk 3 and the plate member 4 rotate with each other after a predetermined rotation of the stopper pin 44 through the cut-away 33. Both ends of the stopper pin 44 are connected to the plate member 4.

The stopper in the foregoing conventional clutches is required to have great strength because the torque acting on the stopper is generally extremely large. Therefore, the problem in the clutch mechanisms illustrated by FIG. 4 and FIG. 5 is the size in the radial direction of the flange 32 as the stopper has to be as large as possible so as to provide a stopper of sufficient strength.

The stopper illustrated in FIG. 6, is required to have increased hardness of the stopper pin 44 in order to increase the strength thereof. However, the hardness of the ends of the stopper pin 44 is required to be decreased in order to permit a rivet connection at the ends of the pin. Accordingly, there is difficulty in the production of the device due to the changing of the hardness of the stopper pin 44 in a unitary body. Moreover, the number of parts is increased by providing the stopper in addition to the springs 61 and 62.

SUMMARY OF THE INVENTION

It is an object of the invention to provide an improved lock-up clutch in a torque converter which obviates the above-described drawbacks.

It is another object of the invention to provide a damper mechanism having sufficient strength.

It is still another object of the invention to avoid interference between parts of the damper mechanism.

In order to accomplish the objects, a lock-up clutch torque converter is provided with a front cover connected to an input shaft, a piston disposed between the front cover and a torque converter mechanism so as to be axially movable on the input shaft and engagable with said front cover. A first member is disposed between the piston and the torque converter mechanism and a pair of second members are provided at both sides of the first member, fixedly connected each other by a connecting member, and rotatable with respect to the first member through a first predetermined rotational angle. A first elastic member is disposed between the first member and the second member and elastically connects the first member and the second member with each other. A second elastic member is provided radially inwardly of the first elastic member for elastically connecting the first member at a second predetermined rotational angle less than the first predetermined rotational angle. A stopper device is provided at the outer periphery of the second member for slowing the rotational speed of the first member with respect to the second member by stopping a projection in the rotational direction at a third predetermined rotational angle which is less greater than the first predetermined rotational angle and the second predetermined rotational angle, respectively.

BRIEF DESCRIPTION OF THE DRAWINGS

FIG. 3 shows an axial cross-sectional view of conventional devices;

FIGS. 4 and 5 show conventional devices with views corresponding to those shown respectively in FIGS. 1 and 2;

DETAILED DESCRIPTION OF PREFERRED EMBODIMENTS OF THE INVENTION

Figure 1:
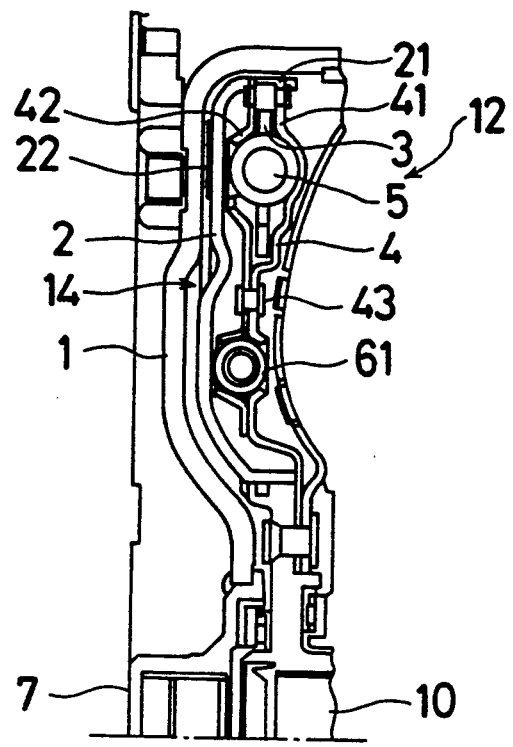
FIG. 1 is a partial axial cross-sectional view of a torque converter according to an embodiment of the invention.
Figure 2:
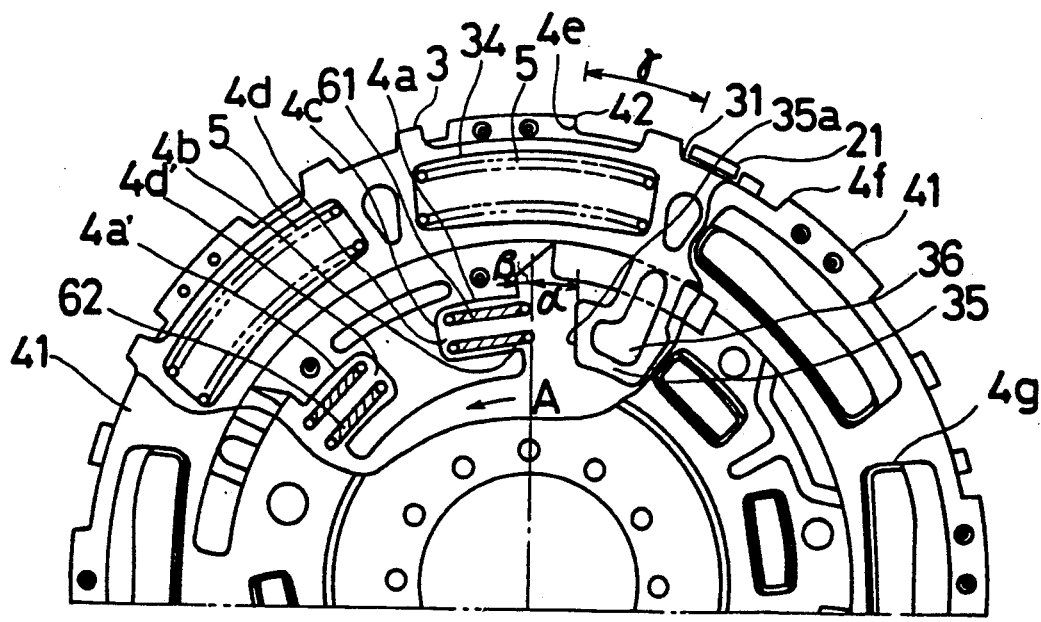
FIG. 2 is a partial side view of the internal construction of a damper in the device in FIG. 1.
Figure 5:
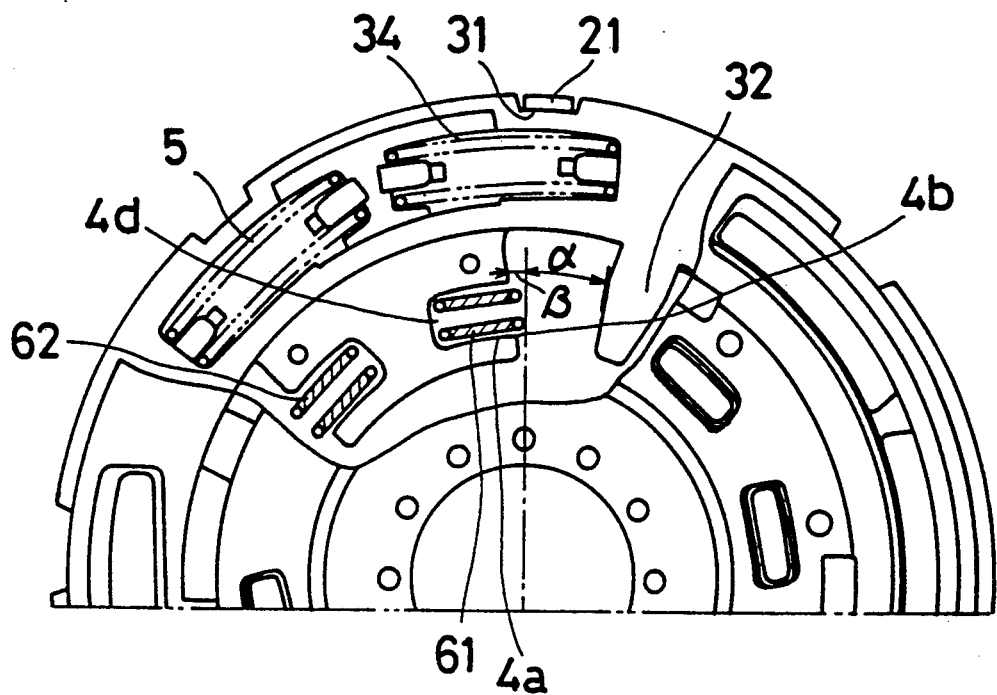
Figure 6:
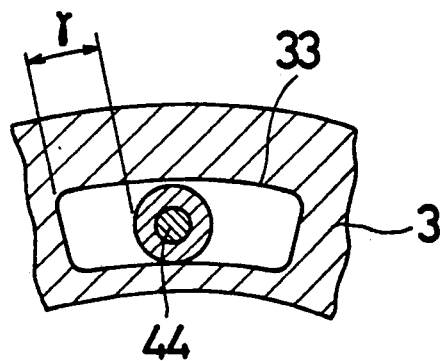
FIG. 6 shows a view illustrating a stopper in a conventional device.

Referring to FIGS. 1 and 2, there is illustrated a lock-up clutch used in a torque converter according to an embodiment of the present invention. A lock-up piston 2 has a plurality of equally spaced projections 21 along an outer periphery of the piston. The projections 21 axially extend and are of sufficient length to be engaged with a first member 3 and a second member 4, both of which will be described in detail later. The first member 3 includes an annular disk having a plurality of equally spaced concave portions 31 along the outer periphery thereof so as to be engaged with the projections 21. The annular disk 3 is axially movable with respect to the lock-up piston 2 and is connected to the lock-up piston 2 so as to be rotatable therewith. The annular disk 3 has a plurality of openings 34 each of which receives a first coil spring 5 or a first elastic member.

The second member 4 has a plurality of openings 4a each of which is defined by a space 4d which is open at one end. The opening 4a is radially inward of the opening 34 and receives a second coil spring 61 or a second elastic member. The second coil spring 61 projects outwardly from the open end 4b and is engagable by a member 35 formed so as to extend radially inwardly along the annular disk 3. The member 35 includes a cut-away portion 36 in order to reduce the weight of the member.

The second member includes a main plate 41 and a sub plate 42 which are in connection with each other by a pin 43 so as to be rotatable with respect to the annular disk 3. The main plate 41 and the sub plate 42 have projections 4e and 4f, respectively. The projections 4e and 4f can be attached to the projection 21 of the lock-up piston 2 at a predetermined rotational angle $\tau$ with respect to the annular disk 3.

The second coil spring 61 is in contact with one end 4c of the opening 4a and projects from the open end 4b a predetermined distance corresponding to a rotational angle $\beta$. A rotational angle $\alpha$ is defined between the end of coil spring 61 projecting from the opening 4a and an end 35a of the pushing member 35. The rotational angles $\alpha$, $\beta$, $\tau$ have the relationship $\alpha + \beta > \tau$.

The operation according to the above mentioned embodiment will be described below.

In FIG. 1, when the lock-up piston 2 is moved toward the front cover I by hydraulic pressure which is supplied into a space defined between the lock-up piston 2 and the torque converter mechanism 12 and hydraulic pressure which is released from a space defined between the lock-up piston 2 and the front cover 1, the lock-up piston 2 is engaged with the front cover I through a friction member 22. The rotational torque transmitted from an engine (not shown) is then transmitted to the annular disk 3 through the lock-up piston 2.

When the lock-up piston 2 is moved toward the torque converter mechanism 12 by hydraulic pressure supplied into the space defined between the lock-up piston 2 and the front cover 1 and hydraulic pressure is released from the space defined between the lock-up piston 2 and the torque converter mechanism 12, the lock-up piston 2 is disengaged from the front cover 1 and the rotational torque transmitted from the engine (not shown) is not transmitted to the lock-up piston 2.

During the lock-up operation, when the annular disk 3 is rotated in a direction indicated by arrow A, the rotation is transmitted from the annular disk 3 to the second member 4 through the first coil spring 5, thereby permitting the annular disk 3 to rotate with respect to the second member 4. Therefore, torque vibrations are absorbed by the first coil spring 5 in a first damping stage.

In the case where the rotational angle between the annular disk 3 and the second member 4 goes to $\alpha$ with compression of the first coil spring 5, one end of the second coil spring 61 projecting from the opening end 4b of the opening 4a is biased by the end 35a of the member 35 at the second stage. Therefore, the second coil spring is compressed in addition to the first coil spring 5.

When further rotational torque is produced, the first coil spring 5 and the second coil spring 61 are compressed. The rotational angle between the annular disk 3 and the second member 4 increases to $\tau$ which is less than $\alpha + \beta$ and is more than $\alpha$. The projection 4e formed at the outer periphery of the second member 4 is attached to the projection 21 of the lock-up piston 2. As a result, the input shaft 7 rotates together with the output shaft 10.

When the annular disk 3 is rotated in the opposite direction of the arrow A, spring 62 which is received in an opening 4a having a open end located on the opposite side of the opening 4a is acted on as described above. Namely, the projection 21 of the lock-up piston 2 is attached to the projection 4f.

Consequently, since the projection 21 of the lock-up piston 2 is attached to the projection 4e or 4f of the second member 4 so as to prevent the urging or pushing member 35 from contacting the open end 4b. As a result, the member 35 and the open end 4b is not required to have increased hardness and increased strength. Also, since the projections 4e and 4f are formed on the outer periphery for input of the rotational torque, the force acted on the projections 4e and 4f is decreased in comparison to the prior art. Furthermore, additional parts are not required in order to increase the intensity. Thus, the production and the cost are advantaged.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A lock-up clutch for use in a torque converter including a torque converter mechanism comprising:
   a front cover of said torque converter connected to said input shaft;

a piston disposed between said front cover and said torque converter mechanism so as to be axially movable and engageable with said front cover;

a first member disposed between said piston and said torque converter mechanism having a concave portion along an outer periphery thereof engaged with a projection formed on an outer periphery of said piston, said first member having an urging member extending radially inwardly therefrom;

a second member including a pair of members provided at both sides of said first member and connected with each other by a connecting member and connected to an output shaft, said second member having an opening defined by a space at one end thereof;

first elastic means disposed between said first member and said second member and having a first coil spring for elastically connecting said first member and said second member with each other;

second elastic means provided radially inwardly of said first elastic means and having a second coil spring for elastically connecting said first member and said second member with each other;

a first predetermined rotational angle defined between one end of said second coil spring projecting from said opening and one end of said urging member;

a second predetermined rotational angle defined between said opening and said one end of said urging member; and stopper means including a stopper projection provided along an outer periphery of said second member for stopping relative rotation between said first member and said second member by connecting the stopper projection to said projection of said piston at a third predetermined rotational angle which is less than said second predetermined rotational angle and greater than said first predetermined rotational angle.

* * * * *